J. M. GERMANSON.
MOLDING FLASK.
APPLICATION FILED SEPT. 25, 1918.
1,326,336.
Patented Dec. 30, 1919.
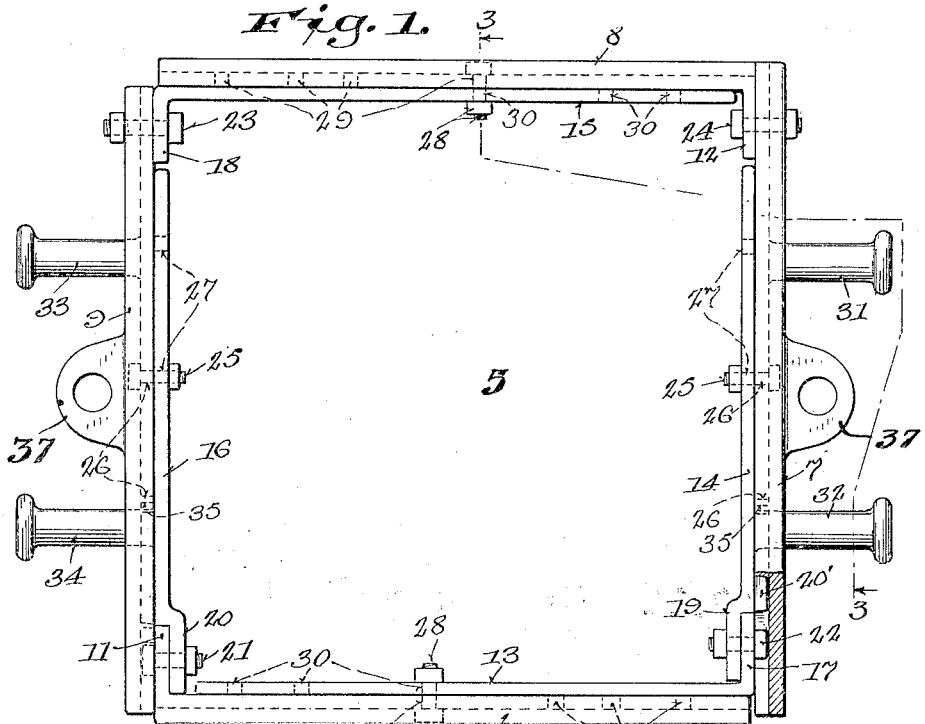
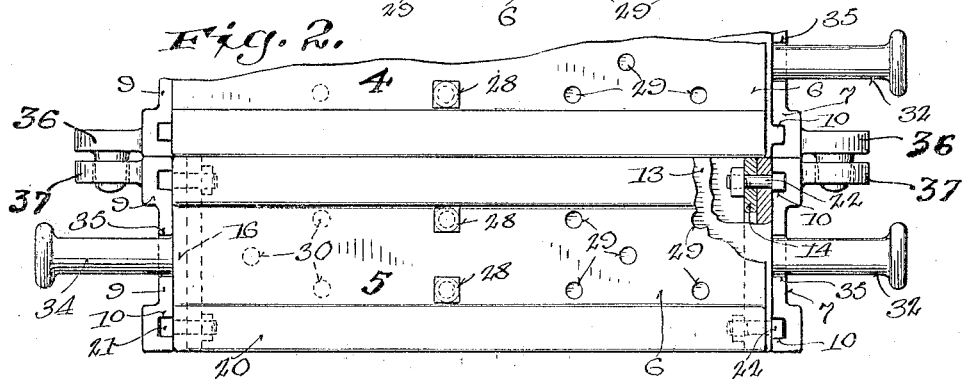
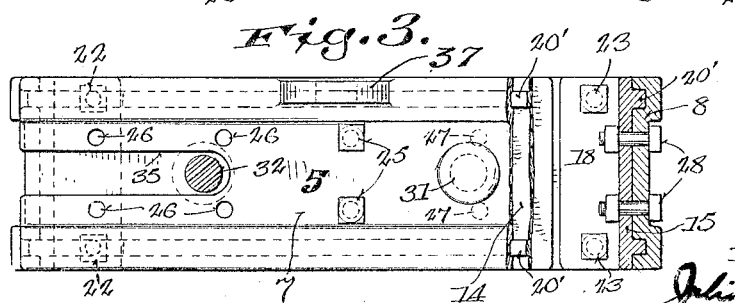
Inventor
Julius M. Germanson
By Morsell, Keeney & French,
Attorneys.

UNITED STATES PATENT OFFICE.

JULIUS M. GERMANSON, OF MILWAUKEE, WISCONSIN.

MOLDING-FLASK.

1,326,336.　　　　Specification of Letters Patent.　　Patented Dec. 30, 1919.

Application filed September 25, 1918.　Serial No. 255,659.

*To all whom it may concern:*

Be it known that I, JULIUS M. GERMANSON, a citizen of the United States, and resident of Milwaukee, in the county of Milwaukee and State of Wisconsin, have invented new and useful Improvements in Molding-Flasks, of which the following is a description, reference being had to the accompanying drawings, which are a part of this specification.

The invention relates to molding flasks and is fully described and explained in the specification and shown in the accompanying drawings in which:

Figure 1 is a plan view of the device, parts being broken away and parts being shown in section;

Fig. 2 is a front end view of the device, parts being broken away and parts being shown in section; and Fig. 3 is a section taken on the line 3—3 of Fig. 1.

In general the device consists of a cope 4 and drag 5 similarly constructed of parts which are adjustable with respect to each other so that the length and breadth of the mold may be varied to accommodate different sized castings.

The cope and drag each consists of an outer frame and an inner frame adjustably connected together.

The outer frame consists of side members 6, 7, 8 and 9, the members 7 and 9 having longitudinally extending grooves 10 therein, the members 6 and 8 having angular extensions 11 and 12 respectively.

The inner frame consists of side members 13, 14, 15 and 16 having guide tongues 21, and the members 13 and 15 having angular extensions 17 and 18 respectively, and the members 14 and 16 having opposite ends 19 and 20 respectively.

The angular extension 11 of the member 6 and the offset portion 20 of member 16 are secured together by bolts 21, the heads of which are slidably mounted in the grooves 10 in the member 9.

The angular extension 17 of the member 13 and the offset portion 19 of the member 14 are secured together by bolts 22, the heads of which are slidably mounted in the grooves 10 in the member 7.

The angular extension 18 of the member 15 is secured to the member 9 by a bolt 23 and the angular extension 12 of the member 8 is secured to the member 7 by a bolt 24.

Thus the members 6, 13, 14 and 16 are secured together by the bolts 21 and 22 and the members 9, 8, 15 and 7 are secured together by the bolts 23 and 24 and as the members 16 and 14 slidably engage the members 9 and 7 the end of the mold section carrying these side members 16 and 14 may be moved outwardly or inwardly with respect to the side members 9 and 7 to adjust the mold to the proper width and the parts are then secured in adjusted position by bolts 25 adapted to be inserted in any one of the spaced holes 26 in the members 7 and 9 and in any one of the spaced holes 27 in the members 14 and 16 which are brought into line with the selected set of holes in the members 7 and 9.

The members 13, 14, 7 and 8 are secured together by the bolts 22 and 24 and the members 6, 9, 16 and 15 are secured together by the bolts 21 and 23 and as the end members 13 and 8 slidably engage the end members 6 and 15 the side of the mold section carrying these end members 13 and 8 may be moved outwardly or inwardly with respect to the end members 6 and 15 to adjust the mold to proper length and the parts are then secured by bolts 28 adapted to be inserted in any one of the spaced holes 29 in the members 6 and 8 and in any one of the spaced holes 30 in the members 13 and 15 which are brought into line with the selected set of holes in the members 6 and 8.

Thus both the cope and drag each consist of side frame members telescoping together so that either or both the width and length of the mold section may be varied.

Each flask section is provided with handles 31, 32, 33 and 34, the handles 31 and 33 being respectively secured to the members 7 and 9 and the handles 32 and 34 being respectively secured to the members 14 and 16, the sides 7 and 9 having slots 35 therein to permit of movement of the handles 32 and 34.

The cope section of the mold carries lugs 36 secured to the side members 7 and 9 and the drag section of the mold carries apertured brackets 37 secured to similar side members on this section and adapted to receive the lugs to hold the sections against lateral movement.

With the above described construction it is not necessary to have on hand a number of flasks of different sizes as the adjustability of the sections permits of the use of one flask for various sized castings and the construction is simple so that the adjustments may be quickly made.

What I claim as my invention is:

1. An adjustable section for a molding flask comprising side members slidably movable with respect to each other to vary the width of the mold, the outer side members each having an elongated slot near one end, and a handle carried by each side member, the handle carried by the innermost side members passing through the slot in the adjacent outer side member to permit the handles to be movable with the side members to adjusted position.

2. In a molding flask, a mold section consisting of members forming the sides and ends thereof, one set of side members being secured to one end member and the other set of side members being secured to the other end member and slidable with respect to the first set to vary the width of the mold section, one set of end members being secured to one side member and the other set of end members being secured to the other side member and slidable with respect to the first set to vary the length of the mold section, and means for securing the members together in adjusted position.

3. In a molding flask, a mold section consisting of end portions and side portions, each side portion consisting of an inner member and an outer member slidably mounted with respect to each other, a handle on the outer member of each side portion, a handle on the inner member of each side portion, said outer members having slots through which the handles on the inner members project.

4. In a molding flask, a mold section consisting of inner side members and outer side members slidably mounted with respect to each other to vary the width and length of the flask, longitudinal guide grooves on the inner side of the outer side members, longitudinal guide tongues upon the outer side of the inner side members and running in said grooves, and means for securing said members together in adjusted position.

5. An adjustable section for a molding flask comprising side members slidably movable with respect to each other to vary the width of the mold, and a handle rigidly secured to each side member and movable therewith to adjusted position, whereby each adjacent pair of handles will be equidistant from the ends of the flask section irrespective of the adjusted position of the side members to evenly balance the load of the flask section on the handles.

In testimony whereof I affix my signature.

JULIUS M. GERMANSON.